United States Patent
Park

(10) Patent No.: US 7,171,052 B2
(45) Date of Patent: Jan. 30, 2007

(54) APPARATUS AND METHOD FOR CORRECTING MOTION OF IMAGE

(75) Inventor: Jeong-hoon Park, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 738 days.

(21) Appl. No.: 10/361,676

(22) Filed: Feb. 11, 2003

(65) Prior Publication Data

US 2003/0223644 A1 Dec. 4, 2003

(30) Foreign Application Priority Data

Jun. 1, 2002 (KR) ............ 10-2002-0030895

(51) Int. Cl.
*G06K 9/36* (2006.01)
(52) U.S. Cl. .................. 382/236; 382/232
(58) Field of Classification Search ............. 382/236, 382/232; 348/208.4, 208.12, 209.99, 208.5; 396/55; 375/240.16
See application file for complete search history.

(56) References Cited

U.S. PATENT DOCUMENTS

| | | | |
|---|---|---|---|
| 6,573,930 B2 * | 6/2003 | Kyuma et al. ............ | 348/208.5 |
| 6,630,950 B1 * | 10/2003 | Ohkawara et al. ...... | 348/208.12 |
| 6,734,901 B1 * | 5/2004 | Kudo et al. .............. | 348/208.4 |
| 6,760,378 B1 * | 7/2004 | Conklin ................. | 375/240.16 |
| 6,778,768 B2 * | 8/2004 | Ohkawara et al. ............ | 396/55 |

FOREIGN PATENT DOCUMENTS

| | | |
|---|---|---|
| CN | 1272031 A | 11/2000 |
| JP | 2000-341577 A | 12/2000 |

OTHER PUBLICATIONS

Xie et al., "Determining Accurate and Reliable Motion Fields for Motion Compensated Interpolation", IEEE, vol. 5, No. 4, Aug. 1995, pp. 367-370.*

* cited by examiner

*Primary Examiner*—Anh Hong Do
(74) *Attorney, Agent, or Firm*—Sughrue Mion, PLLC

(57) ABSTRACT

An apparatus and method for correcting motion of an image, which occurs due to a shake of a hand or vibration of a system, considering the correlation between frames are provided for an image processing system, which performs motion estimation and compression on an input image signal, thereby increasing compression efficiency. The apparatus includes at least a frame memory and a motion estimator/corrector. The memory stores an input image signal as a current frame image. The motion estimator/corrector estimates a motion of an image within a predetermined motion estimation range in the current frame image on the basis of a previous frame image, detects an image area to be compressed from the current frame image, and provides the detected image area to be compressed as a current frame image area for normal motion estimation so that the motion of the input image signal can be corrected.

16 Claims, 3 Drawing Sheets

APPARATUS AND METHOD FOR CORRECTING MOTION OF IMAGE

CROSS-REFERENCE TO RELATED APPLICATIONS

This application claims the priority of Korean Patent Application No. 2002-30895 filed Jun. 1, 2002, which is incorporated herein in its entirety by reference.

BACKGROUND OF THE INVENTION

1. Field of the Invention

The present invention relates to an image processing system for compressing an input image signal, and more particularly, to an apparatus and method for correcting a motion of an image, which occurs due to a shake of a hand or vibration of a system, thereby increasing efficiency in compressing an image signal.

2. Description of the Related Art

Image processing systems that users can carry with them to collect image signals need a function of correcting a motion of an image, which occurs due to a shake of a hand or vibration of a system including image processing systems. This is because it is highly likely that a hand shake or vibration of a system occurs while portable image pickup apparatuses are used to collect image signals. If a hand shake or vibration of a system occurs when collecting image signals, an image is recognized as having a motion even if the image has no motion. Accordingly, image processing systems need a function of correcting a motion of an image. For example, video cameras may be included in such image processing systems.

A motion correction function provided for conventional video cameras detects the amount of vibration of a camera using a vibration sensor and moves an image on a lens up, down, to the left, or to the right based on the amount of vibration, thereby correcting the motion of the image. Video cameras can compress a motion-corrected image signal and store or transmit the compressed image signal to another apparatus. Most video cameras compress an image signal using an intra coding method. In the intra coding method, an input image signal is compressed regardless of the correlation with another image.

As described above, conventional video cameras do not consider the correlation between frames when correcting a motion occurring due to a shake of hand or vibration of a system and when compressing an image signal. Accordingly, conventional video cameras have a limitation in collecting a large volume of images, such as a motion picture.

To overcome this problem, there have been attempts to apply a compression method, such as the Moving Picture Experts Group standards, (MPEG)-2 or MPEG-4, using both intra coding method and inter coding method to image processing systems such as video cameras. In case of using MPEG-2 or MPEG-4 as a compression method, if an image signal, for which motion occurring due to a shake of a hand or vibration of a system has been corrected as described above, is used, a compression efficiency for the image signal may be decreased in an inter coding mode. This is because the motion correction is performed in units of scenes without considering the correlation of the image signal with another image, whereas a motion is estimated and corrected considering the correlation between a current frame and a previous frame, and a difference image resulting from the motion estimation and correction is compressed in the inter coding mode.

SUMMARY OF THE INVENTION

To solve the above-described problems, it is a first object of the present invention to provide an apparatus and method for correcting a motion of an image, which occurs due to a shake of a hand or vibration of a system, thereby increasing efficiency in compressing an image signal in an image processing system, which performs motion estimation and compression on an input image signal.

It is a second object of the present invention to provide an apparatus and method for correcting a motion of an image, which occurs due to a shake of a hand or vibration of a system, considering the correlation between frames.

It is a third object of the present invention to provide an apparatus and method for correcting a motion of an image, which occurs due to a shake of a hand or vibration of a system, in two steps, thereby increasing efficiency in compressing an image signal.

To achieve one or more objects of the present invention, in one embodiment, there is provided an apparatus for correcting a motion of an image in an image processing system. The apparatus includes a frame memory which stores an input image signal as a current frame image; and a motion estimator/corrector which estimates a motion of an image within a predetermined motion estimation range in the current frame image on the basis of a previous frame image, detects an image area to be compressed from the current frame image, and provides the detected image area to be compressed as a current frame image area for normal motion estimation so that the motion of the input image signal can be corrected.

Preferably, the image signal input into the frame memory is a signal for which a motion occurring due to a shake of a hand or vibration of a system has been corrected in units of scenes. Preferably, the predetermined motion estimation range is set such that a real motion of an input image signal is not recognized as a motion occurring due to a shake of a hand or vibration of a system.

Preferably, the motion estimator/corrector detects motion vectors in units of predetermined blocks, calculates an average motion vector of the predetermined motion estimation range using the detected motion vectors, and detects the image area to be compressed using the average motion vector.

Preferably, the motion estimator/corrector uses motion vectors of blocks, for which a difference between the previous frame image and the current frame image is slight, among the detected motion vectors for the normal motion estimation.

In another embodiment, there is provided an apparatus for correcting a motion of an image in an image processing system. The apparatus includes a motion corrector which corrects a motion that occurs due to a vibration in an input image signal in units of scenes, and which determines a predetermined motion estimation range according to an amount of the vibration; a frame memory which stores an image signal output from the motion corrector as a current frame image; and a motion estimator/corrector which estimates a motion of an image within a predetermined motion estimation range in the current frame image on the basis of a previous frame image, detects an image area to be compressed from the predetermined motion estimation range, and provides the detected image area to be compressed as a current frame image area for normal motion estimation so that the motion of the input image signal can be corrected.

To achieve one or more objects of the present invention, in one embodiment, there is also provided a method of correcting a motion of an image in an image processing system. The method includes storing an input image signal as a current frame image; estimating a motion of an image within a predetermined motion estimation range in the current frame image on the basis of a previous frame image and detecting an image area to be compressed from the current frame image; and providing the detected image area to be compressed as a current frame image area for normal motion estimation.

Preferably, the detecting and providing of the image area to be compressed are performed in an inter coding mode, and the predetermined motion estimation range is set such that a real motion of an input image signal is not recognized as a motion occurring due to a shake of a hand or vibration of a system.

Preferably, the detecting of the image area to be compressed includes estimating the motion in units of predetermined blocks to detect motion vectors; calculating an average motion vector of the predetermined motion estimation range using the detected motion vectors; and detecting the image area to be compressed using the average motion vector. Preferably, the input image signal is a signal for which a motion occurring due to a shake of a hand or vibration of a system has been corrected in units of scenes.

In another embodiment, there is provided a method of correcting a motion of an image in an image processing system. The method includes correcting the motion that occurs due to the vibration in the input image signal in units of scenes; storing the corrected image signal as a current frame image; when the image processing system is in an inter coding mode, estimating a motion of an image within a predetermined motion estimation range in the current frame image on the basis of a previous frame image and detecting an image area to be compressed from the predetermined motion estimation range; and providing the detected image area to be compressed as a current frame image area for normal motion estimation.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 1:
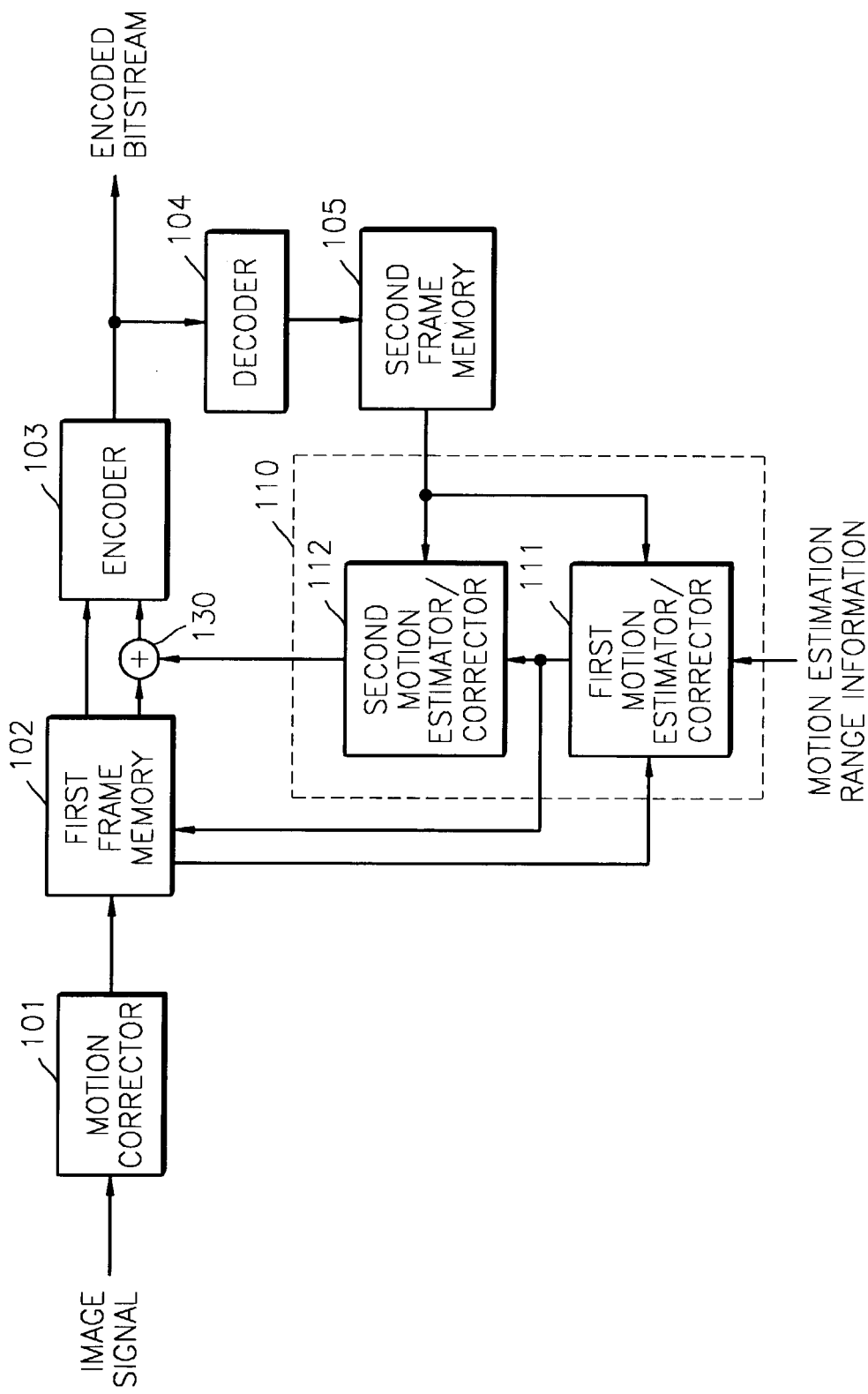
FIG. 1 is a block diagram of an image processing system having an apparatus for correcting a motion of an image according to a preferred embodiment of the present invention.

FIG. 1 is a block diagram of an image processing system having an apparatus for correcting a motion of an image according to a preferred embodiment of the present invention. Referring to FIG. 1, the image processing system includes a motion corrector 101, a first frame memory 102, an encoder 103, a decoder 104, a second frame memory 105, a motion estimation/correction unit 110, and an adder 130.

The motion corrector 101 corrects a motion included in an input image signal in units of scenes according to a shake of a hand or vibration of a system. As is used in conventional video cameras, a correction method of moving an image on a lens up, down, to the left, or to the right according to the detected amount of vibration may be applied to the motion corrector 101. Besides, any conventional technique of correcting a motion through mechanical or electronic control may be applied to the motion corrector 101. The image signal, for which the motion has been corrected in units of scenes by the motion corrector 101, is transmitted to the first frame memory 102.

Figure 2:
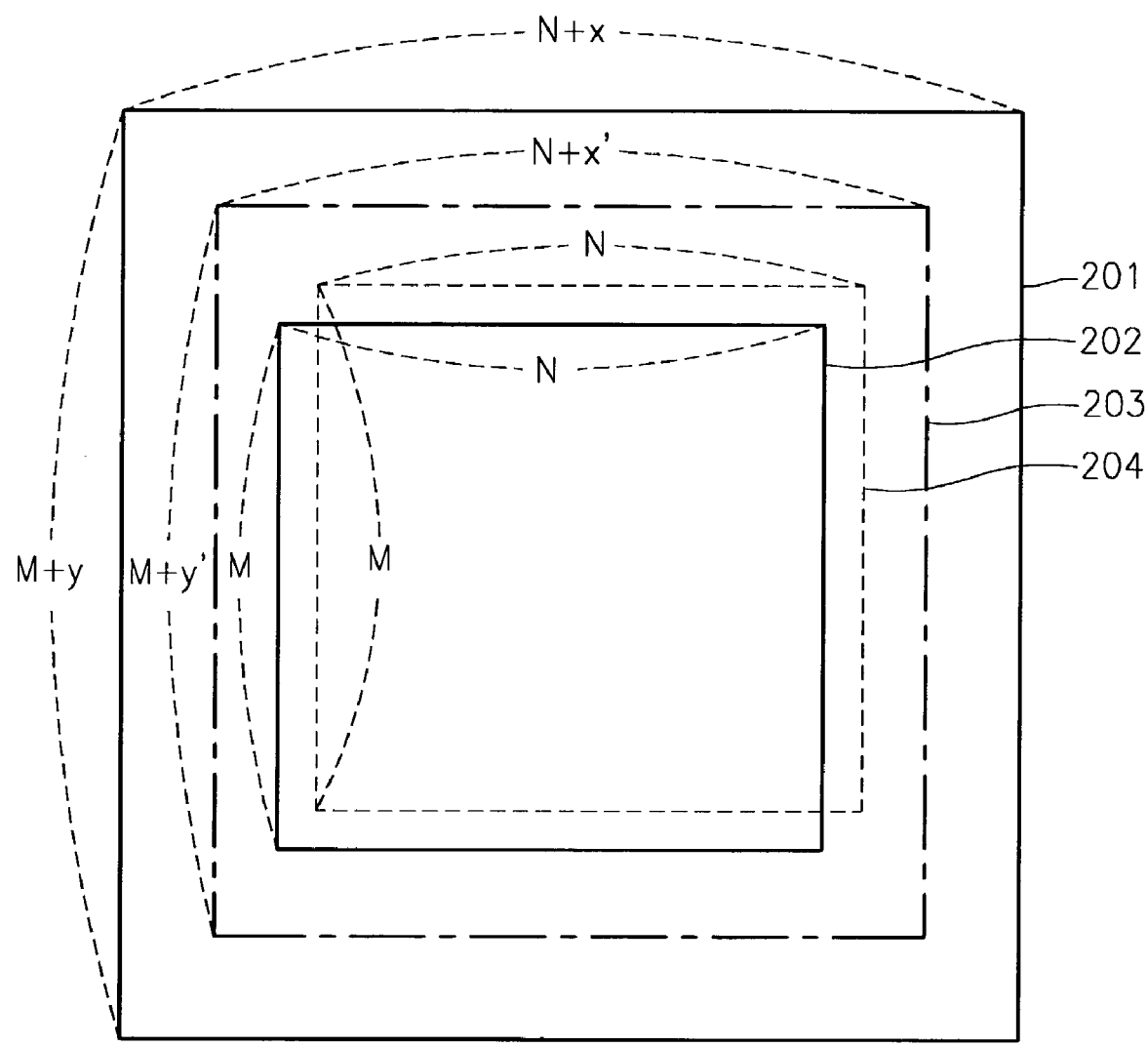
FIG. 2 shows examples of a frame image scene for explaining the operation of the apparatus for correcting a motion of an image, which is shown in FIG. 1.

The first frame memory 102 stores the primarily motion-corrected image signal from the motion corrector 101 as a current frame image. The current frame image includes entire resolution. In other words, a frame image 201 that is expressed by ((N+x)×(M+y)) pixels in FIG. 2 showing examples of a scene is stored in the first frame memory 102.

If the compression mode of the image processing system is an intra coding mode, only an image signal that is included in an image area to be compressed in the current frame image stored in the first frame memory 102 is transmitted to the encoder 103. Here, the image area to be compressed is a resolution area 202 expressed by (N×M) pixels in FIG. 2. The image area 202 is predetermined in accordance with an image area that is actually displayed with respect to an input image signal.

However, if the compression mode of the image processing system is an inter coding mode, only an image signal that is included in the image area provided from the motion estimation/correction unit 110 is provided to the adder 130. The image area is an image area to be compressed and has a resolution of (N×M) pixels, as in the intra coding mode. However, since the image area is obtained from motion correction considering the correlation between frames according to the present invention, its position is variable. Accordingly, the image area to be compressed may be the area 202 or an area 204 in FIG. 2.

In the inter coding mode, the adder 130 transmits a difference image between the image signal output from the first frame memory 102 and the image signal output from the motion estimation/correction unit 110 to the encoder 103.

In the intra coding mode, the encoder 103 performs discrete cosine transform (DCT) and quantization on the image signal transmitted from the first frame memory 102 to output an encoded bitstream. In the inter coding mode, the encoder 103 performs discrete cosine transform (DCT) and quantization on the difference image transmitted from the adder 130 to output an encoded bitstream. The bit stream output from the encoder 103 is transmitted to a next terminal (not shown) for a process such as variable length coding and to the decoder 104.

The decoder 104 restores the bit stream to a form before the encoding. For this restoration, the decoder 104 is designed to perform signal processing in reverse order of the encoder 103. In other words, the decoder 104 performs dequantization and inverse DCT on the bitstream.

The restored image signal is stored in the second frame memory 105. An image signal stored in the second frame memory 105 has resolution having a size of (N×M) pixels shown in FIG. 2 since an image area that is actually compressed in a frame image signal of an image signal is an (N×M)-pixel area.

The motion estimation/correction unit 110 is composed of a first motion estimator/corrector 111 and a second motion estimator/corrector 112. The first motion estimator/corrector 111 is provided for correcting a motion occurring in an image signal due to a shake of a hand or vibration of a system. More specifically, the first motion estimator/corrector 111 reads an image signal included in the area 203 shown in FIG. 2 from the image area 201 having a resolution of ((N+x)×(M+y)) pixels, which is stored in the first frame memory 102, based on motion estimation range information. The area 203 is a motion estimation range. The first motion estimator/corrector 111 estimates the motion of the image signal in the area 203 on the basis of the previous frame image stored in the second frame memory 105. Motion estimation may be performed in units of predetermined blocks in the same manner as used in MPEG-2 or MPEG-4. Accordingly, a motion vector is detected in units of predetermined blocks.

Then, the first motion estimator/corrector 111 calculates an average motion vector V(x, y) of the area 203 using motion vectors detected in predetermined block units as shown in the following formula.

$$V(x, y) = \frac{1}{M} \sum_{m=0}^{M-1} Vm(x, y)$$

Here, M denotes the number of predetermined blocks, and Vm(x,y) denotes a motion vector of an m-th block.

Next, the first motion estimator/corrector 111 detects an image area to be compressed from the predetermined motion estimation range 203 using the calculated average motion vector. In FIG. 2, the area 204 is the image area to be compressed that is detected through motion estimation.

In FIG. 2, the area 201 is the resolution of an image stored in the first frame memory 102, the area 202 is the resolution of an image to be compressed by the encoder 103, the area 203 is a predetermined motion estimation range, and the area 204 is an image area to be compressed, for which a motion occurring due to a hand shake or vibration of a system included in an input image is corrected.

The motion estimation range is set such that an actual motion is not dealt as a motion occurring due to a shake of a hand or vibration of a system. In other words, an actual motion, or real motion, includes motion of an image not due to the shake of a hand or vibration of a system, and/or motion of an image relative to a substantially fixed image processing system. The motion estimation range may be set by a user or manufacturer in advance or may be set according to the amount of vibration, which is detected by the motion corrector 101 for correcting an input image signal. When the motion estimation range is set according to the amount of vibration, it is variable.

As described above, motion estimation and correction that has been performed in the inter coding mode is performed using the detected image area to be compressed so that normal motion estimation and correction can be performed on an image signal for which a motion, which occurs due to a shake of a hand or vibration of a system, has been compensated considering the correlation between frames.

Information about the detected image area is provided to the first frame memory 102 and controls the area of an image signal output from the adder 130. The first motion estimator/corrector 111 also provides an image signal corresponding to a current frame to the second motion estimator/corrector 112. Here, the first motion estimator/corrector 111 can provide some motion vectors among the motion vectors detected in predetermined block units to the second motion estimator/corrector 112. A motion vector provided to the second motion estimator/corrector 112 may have a value of (0,0) or may be a motion vector of a block for which a difference between a current frame and a previous frame is recognized slight. For example, a motion vector of a block at the border of an image signal may be provided to the second motion estimator/corrector 112. Accordingly, the second motion estimator/corrector 112 may not need to perform motion estimation and correction on a block for which a motion vector is provided.

The second motion estimator/corrector 112 performs real motion estimation and correction on an input image signal as in existing MPEG-2 or MPEG-4 standards. In other words, the second motion estimator/corrector 112 performs motion estimation and correction on an input image signal considering the correlation between a current frame, for which motion correction has been performed according to the present invention, and an image signal stored in the second frame memory 105. The second motion estimator/corrector 112 provides the corrected image signal to the adder 130. As described above, the second motion estimator/corrector 112 performs motion estimation and correction on an image signal for which a motion occurring due to a shake of a hand or vibration of a system has been corrected.

Figure 3:
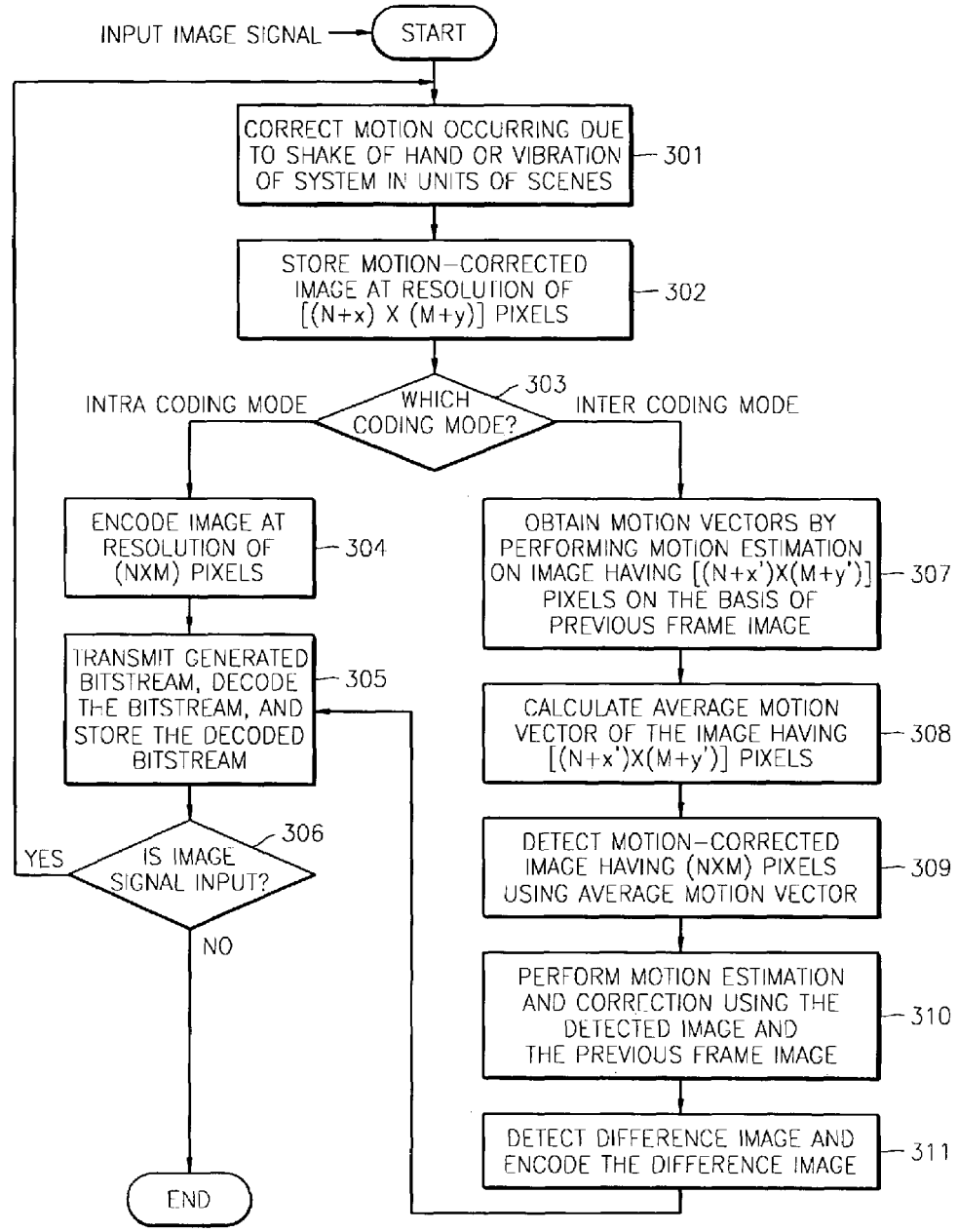
FIG. 3 is a flowchart of a method of correcting a motion of an image according to a preferred embodiment of the present invention.

FIG. 3 is a flowchart of a method of correcting a motion of an image according to a preferred embodiment of the present invention.

If an image signal is input, a system having an apparatus according to the present invention corrects a motion, which occurs due to a shake of a hand or vibration of the system, in units of scenes in the same manner as in the motion corrector 101 in step 301.

The system stores an image, for which the motion has been corrected in units of scenes, in the first frame memory 102 as a current frame image in step 302. The stored image has a resolution of ((N+x)×(M+y)) pixels.

The current coding mode of the system is determined in step 303.

If the current coding mode is determined as an intra coding mode in step 303, the system encodes an image signal, which is included in an image area having a resolution of (N×M) pixels within the image having the resolution of ((N+x)×(M+y)) pixels, in the same manner as in the encoder 103 in step 304. The image area of (N×M) pixels is predetermined as an image area to be compressed.

A bitstream generated from encoding is transmitted to a next terminal (for example, a variable length encoder) and simultaneously is decoded to restore the original image signal in step 305. The restored image signal is stored in the second frame memory 105 as a previous frame image.

It is determined whether an image signal is input in step 306. If it is determined that an image signal is input in step 306, the procedure returns to step 301. However, if it is determined that no image signal is input, the procedure ends.

If it is determined that the current coding mode is an inter coding mode in step 303, a motion of a current frame image included in a motion estimation range is estimated on the basis of a previous frame image in step 307. The motion estimation range may be set as described in FIG. 1. Accordingly, the area 203 having a resolution of ((N+x')×(M+y')) pixels shown in FIG. 2 is the motion estimation range. The previous frame image is an image stored in the second frame memory 105. The motion estimation is performed in units of predetermined blocks. Accordingly, a motion vector is obtained for each block. As described in FIG. 1, a method used in MPEG-2 or MPEG-4 may be used for the motion estimation.

An average motion vector of the motion estimation range 203 having ((N+x')×(M+y')) pixels is calculated by the above formula in step 308.

A motion-corrected image area is detected using the average motion vector in step 309. The detected image area is an image area to be compressed. Accordingly, the detected image area has a resolution of (N×M) pixels. The position of the detected image area is variable within the area 203 having a resolution of ((N+x')×(M+y')) pixels shown in FIG. 2.

Normal motion estimation and correction is performed using an image included in the detected image area and the previous frame image in the same manner as in the second motion estimator/corrector 112 in step 310. In other words, a real motion existing in the input image signal is estimated and corrected.

A difference image between a current frame image, which is included in the detected image area within the image signal stored in the first frame memory 102, and an image resulting from the normal motion estimation and correction is detected in step 311. The detected difference image is encoded in the same manner as in the encoder 103. Then, the operation of the system returns to step 305, and the above-described procedure is repeated.

According to the present invention, after a motion of an image, which occurs due to a shake of a hand or vibration of a system, is corrected in units of scenes, a real motion of the image is finely corrected considering the correlation between frames, thereby increasing compression efficiency of an image processing system which estimates a motion of an input image signal and compresses the input image using intra and inter coding modes. Particularly, in the inter coding mode, an increase of a compression rate can be expected by minimizing a difference image obtained from motion estimation and correction.

The present invention is not restricted to the above-described embodiments, and it will be apparent that various changes can be made by those skilled in the art without departing from the spirit of the invention. Therefore, the scope of the invention is defined not by the detailed description of the invention but by the appended claims.

What is claimed is:

1. An apparatus for correcting a motion of an image in an image processing system, the apparatus comprising:
   a frame memory which stores an input image signal as a current frame image,
   wherein the input image signal is an image signal for which a motion occurring due to a shake of a hand or vibration of a system has been corrected in units of scenes;
   a first motion estimator/corrector which estimates a motion of an image within a predetermined motion estimation range in the current frame image on the basis of a previous frame image, and detects an image area to be compressed from the current frame image; and
   a second motion estimator/corrector which corrects the motion of the image area to be compressed which is detected by the first motion estimator/corrector on the basis of a previous frame image.

2. The apparatus of claim 1 wherein the predetermined motion estimation range is set such that a real motion of the input image signal is not recognized as a motion occurring due to a shake of a hand or vibration of a system.

3. The apparatus of claim 1 wherein the first motion estimator/corrector detects motion vectors in units of predetermined blocks, calculates an average motion vector of the predetermined motion estimation range using the detected motion vectors, and detects the image area to be compressed using the average motion vector.

4. The apparatus of claim 3, wherein the first motion estimator/corrector provides some of the motion vectors detected in units of predetermined blocks to the second motion estimator/corrector.

5. The apparatus of claim 4, wherein the some of the motion vectors include motion vectors of blocks, for which a difference between the previous frame image and the current frame image is slight.

6. An image processing system capable of correcting a motion of an image, the system comprising:
   a motion corrector which corrects a motion that occurs due to a vibration in an input image signal in units of scenes;
   a frame memory which stores an image signal output from the motion corrector as a current frame image; and
   a first motion estimator/corrector which estimates a motion of an image within a predetermined motion estimation range in the current frame image on the basis of a previous frame image, detects an image area to be compressed from the predetermined motion estimation range, and provides information about the detected image area to be compressed to the frame memory;
   a second motion estimator/corrector which corrects the motion of the image area to be compressed which is detected by the first motion estimator/corrector on the basis of a previous frame image;
   an adder which outputs a difference image between an image within the image area to be compressed, which is detected by the first motion estimator of the current frame image stored in the frame memory, and an image signal output from the second motion estimator/corrector; and
   an encoder which encodes the current frame image output from the frame memory in an intra coding mode of the image processing system, and encodes the difference image output from the adder in an inter coding mode of the image processing system,
   wherein the frame memory outputs the current frame image in the intra coding mode, and outputs an image of the image area to be compressed which is detected by the first motion estimator/corrector of the current frame image in the inter coding mode.

7. The system of claim 6, wherein the predetermined motion estimation range is determined according to an amount of vibration which is detected for motion correction by the motion corrector.

8. The system of claim 6, wherein the predetermined motion estimation range is set such that a real motion of the input image signal is not recognized as a motion occurring due to a shake of a hand or vibration of a system.

9. The of claim 6, system wherein the motion estimator/corrector estimates the motion in units of predetermined blocks to detect motion vectors, calculates an average motion vector of the predetermined motion estimation range using the detected motion vectors, and detects the image area to be compressed using the average motion vector.

10. A method of correcting a motion of an image in an image processing system, the method comprising:
    storing an input image signal as a current frame image, wherein the input image signal is an image signal for which a motion occurring due to a shake of a hand or vibration of a system has been corrected in units of scenes;

estimating a motion of an image within a predetermined motion estimation range in the current frame image on the basis of a previous frame image and detecting an image area to be compressed from the current frame image; and estimating and correcting a motion of the detected image area to be compressed.

11. The method of claim 10, wherein the detecting of the image area to be compressed and the estimating and correcting of the motion of the detected image area to be compressed are performed in an inter coding mode of the image processing system.

12. The method of claim 10, wherein the predetermined motion estimation range is set such that a real motion of the input image signal is not recognized as a motion occurring due to a shake of a hand or vibration of a system.

13. The method of claim 10, wherein the detecting of the image area to be compressed comprises:

estimating the motion in units of predetermined blocks to detect motion vectors; calculating an average motion vector of the predetermined motion estimation range using the detected motion vectors; and detecting the image area to be compressed using the average motion vector.

14. A method of correcting a motion of an image in an image processing system, the method comprising:

correcting a motion that occurs due to vibration in the input image signal in units of scenes;

storing the corrected image signal as a current frame image;

when the image processing system is in an inter coding mode, estimating a motion of an image within a predetermined motion estimation range in the current frame image on the basis of a previous frame image and detecting an image area to be compressed from the predetermined motion estimation range;

estimating and correcting in the inter coding mode a motion of the image area to be compressed on the basis of the previous frame image;

obtaining in the interceding mode a difference image between the image area to be compressed and a corrected image obtained by estimating and correcting the motion of the image area to be compressed; and encoding the current frame image when the image processing system is in the intra coding mode, and encoding the difference image when the image processing system is in the inter coding mode.

15. The method of claim 14, wherein the predetermined motion estimation range is determined according to an amount of vibration which is detected during the correcting of the motion in units of scenes.

16. The method of claim 14, wherein the detecting of the image area to be compressed comprises:

estimating the motion in units of predetermined blocks to detect motion vectors;

calculating an average motion vector of the predetermined motion estimation range using the detected motion vectors; and detecting the image area to be compressed using the average motion vector.

* * * * *